UNITED STATES PATENT OFFICE.

WILLIAM MAYNARD, OF NEW YORK, N. Y.

PROCESS OF PURING HIDES AND SKINS.

SPECIFICATION forming part of Letters Patent No. 249,540, dated November 15, 1881.

Application filed August 24, 1881. (No specimens.)

*To all whom it may concern:*

Be it known that I, WILLIAM MAYNARD, of the city, county, and State of New York, have invented a new and useful Process of "Puring" Hides and Skins and Pieces of the same, of which the following is a specification.

This invention is an improvement upon and is adapted to be worked with part of that patented by me in United States Letters Patent No. 136,082, or may be worked without that invention.

The object of this invention is to cleanse and purify hides and skins, or pieces of the same, from lime and humus, and also to remove the epidermis when desirable, and any hairs remaining from the depilation after liming, in a cheaper, safer, more effective, and expeditious manner than has hitherto been known. Accordingly, in the practice of my invention I have discovered that I can utilize the "soak" described in my said patent, which is a liquor composed of water impregnated with sulphur dioxide that has previously been employed in soaking and softening the skins in preparing them for the liming operation. This results in a great saving of expense, and besides avoids the disagreeable odor attendant upon the use of excrement of animals, which is at present employed. The soak, after the softened hides have been removed, contains sulphur, phosphorus, and carbon, with traces of nitrogen, in combination with hydrogen, because in the soaking operation the skins have absorbed oxygen while the elements above described have been eliminated from the skins and remain in the bath. All these in combination are efficient, and especially the phosphorus and hydrogen, in the cleansing and puring process. I have found that this solution sometimes lacks sufficient ammonia for the purpose of cleansing rapidly, and also that the lime requires something with which it can enter more rapidly into combination, and which will also render it soluble. I therefore occasionally employ chloride of ammonium, and sometimes sugar in small quantities, while I have found argols to assist the effect produced by the soak, and to be a very useful, and in some cases necessary, adjunct. I have found that the use of argols and chloride of ammonium, singly or in combination, is non-effective without the soak, inasmuch as while the lime has been eliminated the skin itself has not been left in that absolutely necessary state of reduction and softness technically known to tanners and readily distinguished by them as "pured." This imperfect state or condition of the skin I find is obviated by the use of the soak, either alone or in combination with small quantities of chloride of ammonium or argols, or both.

I have found that in puring I can more or less successfully use the following as substitutes for the chloride of ammonium and argols, viz: sugar, hydrochloric acid, chloride of potassium, and caseine; but I would recommend the chloride of ammonium and argols as preferable.

Instead of using the soak, as above set forth, it is, of course, possible to manufacture sulphureted hydrogen, or even the hydrogen compounds of carbon and phosphorus; but this expensive course need not be resorted to, because the soak is always at hand and available without cost, after it has served its ordinary purpose in the soaking operation.

In the old process it has been necessary to employ skilled labor during the operation of puring, because of the tendency to decomposition produced by the use of animal excrement, particularly of dogs. This state of decomposition is designated by tanners generally as "running away," and means what it implies—that the skins are frequently decomposed into a state of liquid putridity. Skilled tanners, by watching the vats, can detect the approach of such a condition, and hence they have to be employed; but there has heretofore been no way devised in connection with the employment of animal excrement in puring to dispense with this class of skilled labor, because there is so much difference in the strength of differerent kinds of excrement, and even so much difference in the strength of that of the same kind, as that of dogs, for instance, (due to the different kinds of food upon which they have been fed—vegetables, bones, &c.,) that practically no definite period can be positively set within which it is safe to let the excrement operate. But by the use of my invention it is practicable to calculate, by knowing the strength of the "bate," which is easily, scientifically, and accurately obtained, the period of time in which the bating or puring can be safely and thoroughly performed. This period will, in practice, vary somewhat, according to the nature of the skins and the electrical condition of the atmosphere; but ordinarily I have found that in about one-fifth the usual time necessary where animal excrement is employed the puring will be satisfactorily completed. Different hides being of varying age and toughness are more or less sensitive to the action of lime; therefore a greater or less quantity of lime has to be used, and it necessarily follows that the bate also should be of variable degrees of strength. I have found in practice that the strength of the liquid, where chloride of ammonium is used, should vary from half a pound to one pound per hundred gallons of the soak, according to the thickness, age, and toughness of the hides and skins to be treated. Although this rule is a guide, it is not arbitrary, because much also depends upon the number of skins to be treated in a given quantity of liquid; but these facts or elements being all such as can be known by a competent superintendent in advance, it is quite easy for him to calculate the short period of time that will be required for the puring operation. It is to be understood that the liquid should be agitated from time to time and the skins moved in the same during this puring process. By my invention all the requirements are fulfilled at less expense and without the disgusting odor, the danger of decomposition by the formation of too much ammonium, or the action of phosphureted gases upon the skin, attendant upon the use of excrement, while the removal of the lime is certain and the action upon the epidermis perfect, without the possibility of damage. Furthermore, the chief agent by which these desirable results are brought about is a product of the tannery itself, which has hitherto been deemed worthless.

Having thus described my invention, what I claim, and desire to secure by Letters Patent, is—

The improved process of puring hides and skins, or pieces of the same, substantially as described, which consists in immersing them in the soak described, sometimes with the addition of a small quantity of chloride of ammonium or argols, or both, or their equivalents, as set forth.

In testimony whereof I have hereunto subscribed my name this 23d day of August, A. D. 1881.

WILLIAM MAYNARD.

Witnesses:
   MARCUS S. HOPKINS,
   JOSEPH I. PEYTON.